(12) United States Patent
Lin et al.

(10) Patent No.: US 10,924,950 B2
(45) Date of Patent: Feb. 16, 2021

(54) CONDITIONAL EXTENSION OF EVALUATION PERIOD FOR RADIO LINK MONITORING IN NEW RADIO MOBILE COMMUNICATIONS

(71) Applicant: MediaTek Inc., Hsinchu (TW)

(72) Inventors: Hsuan-Li Lin, Hsinchu (TW); Kuhn-Chang Lin, Hsinchu (TW)

(73) Assignee: MediaTek Inc.

( * ) Notice: Subject to any disclaimer, the term of this patent is extended or adjusted under 35 U.S.C. 154(b) by 34 days.

(21) Appl. No.: 16/408,828

(22) Filed: May 10, 2019

(65) Prior Publication Data

US 2019/0349797 A1 Nov. 14, 2019

Related U.S. Application Data

(60) Provisional application No. 62/670,413, filed on May 11, 2018, provisional application No. 62/674,687, filed on May 22, 2018.

(51) Int. Cl.
| | |
|---|---|
| *H04W 24/08* | (2009.01) |
| *H04W 24/10* | (2009.01) |
| *H04W 4/16* | (2009.01) |
| *H04W 48/18* | (2009.01) |
| *H04W 84/04* | (2009.01) |

(52) U.S. Cl.
CPC ........... *H04W 24/08* (2013.01); *H04W 24/10* (2013.01); *H04W 84/042* (2013.01)

(58) Field of Classification Search
CPC ... H04W 24/08; H04W 24/10; H04W 84/042; H04W 48/18; H04W 48/16
See application file for complete search history.

(56) References Cited

U.S. PATENT DOCUMENTS

| | | | |
|---|---|---|---|
| 2012/0281563 A1* | 11/2012 | Comsa | H04W 24/10 370/252 |
| 2014/0153526 A1 | 6/2014 | Mazzarese | |
| 2015/0103777 A1 | 4/2015 | Chen et al. | |

FOREIGN PATENT DOCUMENTS

| | | |
|---|---|---|
| CN | 103945446 A | 7/2014 |
| CN | 107949064 A | 4/2018 |
| WO | WO 2018106043 A1 | 6/2018 |

OTHER PUBLICATIONS

NTT Docomo, Inc., Remaining issues on Radio link monitoring based on SSB, 3GPP TSG RAN WG4 Meeting #86, R4-1802538, Athens, Greece, Feb. 26-Mar. 2, 2018 (line-numbered) (Year: 2018).*

(Continued)

*Primary Examiner* — Moo Jeong
(74) *Attorney, Agent, or Firm* — Han IP PLLC; Andy M. Han

(57) ABSTRACT

Techniques and examples of evaluation period for radio link monitoring (RLM) in New Radio (NR) mobile communications are described. An apparatus performs RLM with respect to a radio link with a cell of a wireless network. In performing the RLM, the apparatus determines whether an RLM reference signal (RLM-RS) is overlapped with one or more other reference signals and, responsive to a result of the determining indicating that the RLM-RS is at least partially overlapped with the one or more other reference signals, extends an evaluation period for the RLM.

14 Claims, 9 Drawing Sheets

(56) References Cited

OTHER PUBLICATIONS

China National Intellectual Property Administration, International Search Report and Written Opinio for International Patent Application No. PCT/CN2019/086438, dated Jun. 27, 2019.
NTT Docomo, Inc., Remaining issues on Radio link monitoring based on SSB, 3GPP TSG RAN WG4 Meeting #86, R4-1802538, Athens, Greece, Feb. 26-Mar. 2, 2018.
China National Intellectual Property Administration, International Search Report and Written Opinion for International Patent Application No. PCT/CN2019/092480, dated Sep. 27, 2019.
NTT Docomo et al., offline summary for mobility (6.1.5), 3GPP TSG RAN WG1 NR adhot #3, R1-1716861, Nagoya, Japan, Sep. 18-21, 2017.
Ericsson, On remaining issues for NR RLM, 3GPP TSG-RAN WG4 Meeting RAN4#85, R4-1713768, Reno, Nevada, USA, Nov. 27-Dec. 1, 2017.
Intel Corporation, Discussion on Hypothetical PDCCH for CSI-RS based RLM, 3GPP TSG-RAN WG4 Meeting #87, R4-1806323, Busan, South Korea, May 21-25, 2018.
Taiwan Intellectual Property Office, Office Action for Taiwan Patent Application No. 108121927, dated Nov. 18, 2020.
Balazs Bertenyi et al., 5G NR Radio Interface, Journal of ICT Standardization, vol. 6, Combined Special Issue 1 & 2, Article No. 3, pp. 31-58, River Publishers, May 2018 (https://www.riverpublishers.com/journal_read_html_article.php?j=JICTS/6/2/3).

* cited by examiner

| Configuration for RLM-RS and MG | Configuration for RLM-RS and SMTC | Configuration for SMTC and Gap | Relaxing Factor P for Scaling |
|---|---|---|---|
| Not Overlapped | Partially Overlapped ($T\_SSB < T\_SMTC$) | Don't Care | $\dfrac{1}{1 - \dfrac{T\_SSB}{T\_SMTC}}$ |
| | Fully Overlapped ($T\_SSB = T\_SMTC$) | Don't Care | $RSF\_A$ |
| Partially Overlapped ($T\_SSB < T\_MGRP$) | Partially Overlapped ($T\_SSB < T\_SMTC$) | Not Overlapped | • $T\_SMTC \neq T\_MGRP$<br>• $T\_SMTC = T\_MGRP$ AND $T\_SSB < 0.5 * T\_SMTC$ | $\dfrac{1}{1 - \dfrac{T\_SSB}{T\_MGRP} - \dfrac{T\_SSB}{T\_SMTC}}$ |
| | | | • $T\_SMTC = T\_MGRP$ AND $T\_SSB = 0.5 * T\_SMTC$ | $\dfrac{1}{1 - \dfrac{T\_SSB}{T\_MGRP}} \times RSF\_B$ |
| | | Partially Overlapped ($T\_SMTC < T\_MGRP$) | $\dfrac{1}{1 - \dfrac{T\_SSB}{MIN(T\_SMTC, T\_MGRP)}}$ |
| | Fully Overlapped ($T\_SSB = T\_SMTC$) | Not Overlapped | Not Applicable (RLM Requirement not defined) |
| | | Partially Overlapped ($T\_SMTC < T\_MGRP$) | $\dfrac{1}{1 - \dfrac{T\_SSB}{T\_MGRP}} \times RSF\_C$ |

FIG. 2A

| Configuration for RLM-RS and MG | Relaxing Factor $P$ for Scaling |
|---|---|
| Not Overlapped | 1 |
| Partially Overlapped ($T\_SSB < T\_MGRP$) | $\dfrac{1}{1 - \dfrac{T_{SSB}}{T_{MGRP}}}$ |

FIG. 2B

CONDITIONAL EXTENSION OF EVALUATION PERIOD FOR RADIO LINK MONITORING IN NEW RADIO MOBILE COMMUNICATIONS

CROSS REFERENCE TO RELATED PATENT APPLICATION

The present disclosure claims the priority benefit of U.S. Provisional Patent Application Nos. 62/670,413 and 62/674,687, filed on 11 May 2018 and 22 May 2018, respectively. The contents of aforementioned applications are herein incorporated by reference in their entirety.

TECHNICAL FIELD

The present disclosure is generally related to mobile communications and, more particularly, to conditional extension of evaluation period for radio link monitoring (RLM) in New Radio (NR) mobile communications.

BACKGROUND

Unless otherwise indicated herein, approaches described in this section are not prior art to the claims listed below and are not admitted as prior art by inclusion in this section.

In mobile communications based on the $3^{rd}$-Generation Partnership Project (3GPP) specifications, such as New Radio (NR), radio link monitoring is a procedure used by a user equipment (UE) to monitor the transmission quality of a radio link (e.g., a physical downlink control channel (PDCCH)). Accordingly, RLM can be useful in helping the UE reduce the number of radio link failures, thereby avoiding service interruptions. In performing RLM, the UE determines the transmission quality of the radio link by comparing an RLM reference signal (RLM-RS) received from a network to a hypothetical PDCCH transmission. The RLM-RS can be a synchronization sequence block (SSB) or channel state information (CSI)-RS, and the evaluation of the reference signal is mapped to a hypothetical PDCCH for RLM. In both a first frequency range (FR1) of 450 MHz~6000 MHz and a second frequency range (FR2) of 24250 MHz~52600 MHz as defined in the 3GPP specification, within a measurement gap (MG), there could be an issue when there is an overlap between RLM and measurement gap repetition period (MGRP) as the UE would not be able to simultaneously perform RLM and MGRP due to different frequency bands being used for RLM and MGRP. Additionally, in FR2, the UE would not simultaneously perform RLM and synchronization signal (SS)/physical broadcast channel (PBCH) block measurement time configuration (SMTC) since RLM and SMTC would utilize different antenna beams. Thus, there may be situations in which the UE needs to extend an evaluation period for RLM.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to provide various schemes, concepts, designs, techniques, methods and apparatus pertaining to conditional extension of evaluation period for RLM in NR mobile communications. As the RLM evaluation period is based on the periodicity of the RLM-RS, under various proposed schemes in accordance with the present disclosure, the evaluation period may be extended based on whether the RLM-RS is overlapped with one or more other reference signals.

In one aspect, a method may involve a processor of an apparatus performing RLM with respect to a radio link with a cell of a wireless network. In performing the RLM, the method may involve the processor determining whether an RLM-RS is overlapped with one or more other reference signals and, responsive to a result of the determining indicating that the RLM-RS is at least partially overlapped with the one or more other reference signals, extending the evaluation period for the RLM.

In one aspect, an apparatus may include a transceiver and a processor coupled to the transceiver. During operation, the transceiver may wirelessly communicate with a cell of a wireless network via a radio link. During operation, the processor may perform, via the transceiver, RLM with respect to the radio link by: (a) determining whether an RLM-RS is overlapped with one or more other reference signals; and (b) extending the evaluation period for the RLM responsive to a result of the determining indicating that the RLM-RS is at least partially overlapped with the one or more other reference signals.

It is noteworthy that, although description provided herein may be in the context of certain radio access technologies, networks and network topologies such as $5^{th}$ Generation (5G)/NR, the proposed concepts, schemes and any variation(s)/derivative(s) thereof may be implemented in, for and by other types of radio access technologies, networks and network topologies such as, for example and without limitation, LTE, LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2A is a diagram of a table of values of a relaxing factor in FR2 in accordance with an implementation of the present disclosure.

FIG. 2B is a diagram of a table of values of a relaxing factor in FR1 in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
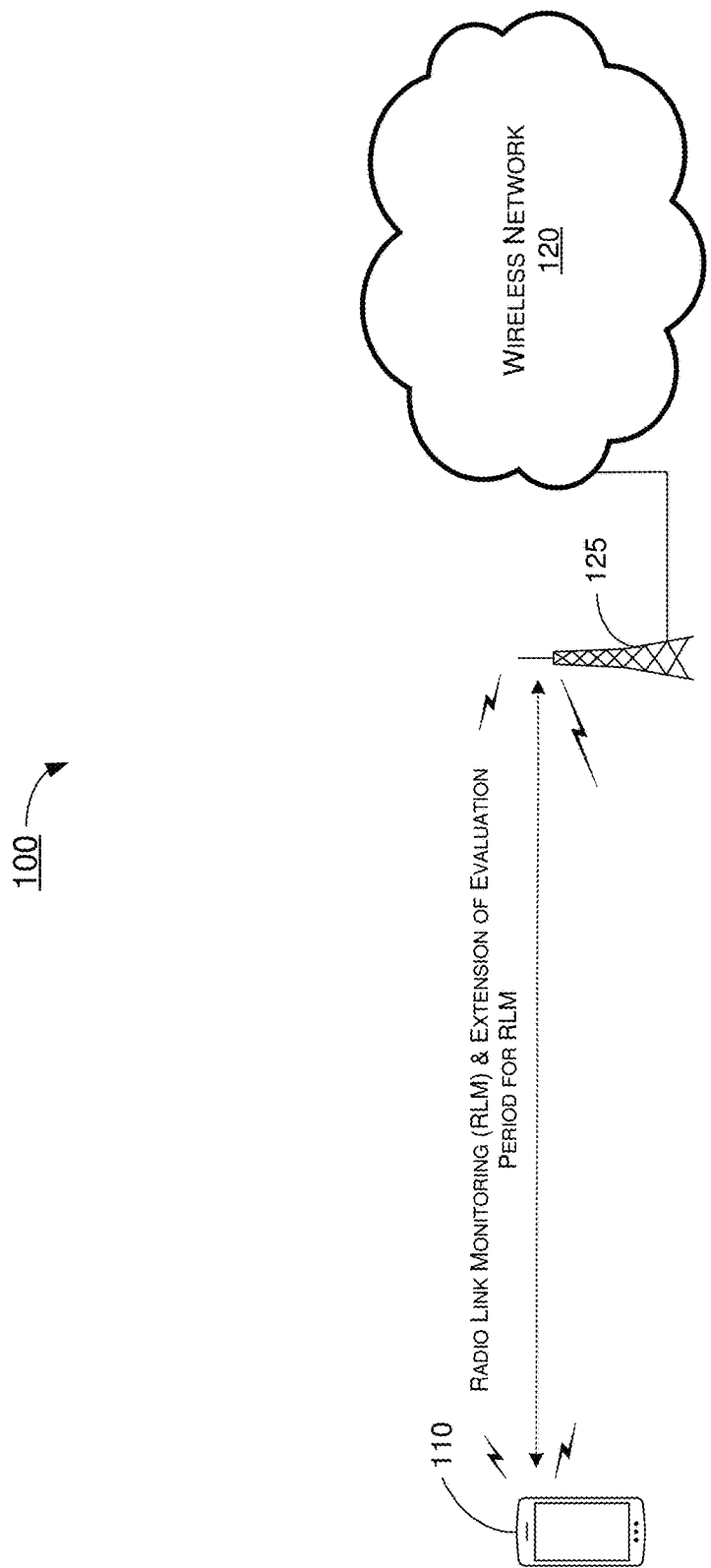
FIG. 1 is a diagram of an example scenario in which various solutions in accordance with the present disclosure may be implemented.

The present disclosure aims to provide solutions, schemes, concepts and/or designs that address aforementioned issues for SSB-based RLM as well as SSB and CSI-RS-based RLM. FIG. 1 illustrates an example scenario 100 in which various solutions, schemes, concepts and/or designs in accordance with the present disclosure may be implemented. Referring to FIG. 1, scenario 100 may involve a UE 110 in wireless communication with a wireless network 120 (e.g., a 5G NR mobile network) via a base station 125 (e.g., an eNB, gNB or transmit-receive point (TRP)). In scenario 100, UE 110 may be in wireless communication with wireless network 120 via base station 125 to perform SSB-based RLM and/or SSB and CSI-RS-based RLM in accordance with various solutions, schemes, concepts and/or designs with respect to the present disclosure, as described below.

In the present disclosure, the phrase "not overlapped" in the sentence "A is not overlapped with B" refers to a condition in which A and B are mutually exclusive, where A and B are both periodic signals. Additionally, the phrase "partially overlapped" in the sentence "A is partially overlapped with B" refers to a condition in which A is punctured by B and a period of A is shorter than a period of B. Moreover, the phrase "fully overlapped in the sentence "A is fully overlapped with B" refers to a condition in which A is equal to B.

In the present disclosure, the term "T_RLM_RS" refers to a periodicity of SSB. The term "T_RLM" refers to a periodicity of RLM-RS, which is equal to T_RLM_RS for SSB-based RLM. The term "T_SMTC" refers to a periodicity of SMTC, which is used to perform intra-frequency measurement. The term "T_MGRP" refers to a periodicity of measurement group repetition period.

In the interest of brevity, each of the various examples provided herein may be described in the context of SSB-based RLM and/or CSI-RS-based RLM. Even so, it is noteworthy that the various proposed schemes in accordance with the present disclosure may be applicable to both SSB-based RLM and CSI-RS-based RLM.

Under a proposed scheme in accordance with the present disclosure, an RLM sharing factor (RSF) may be provided to address the sharing ratio between RLM and intra-frequency measurement without gap. Under the proposed scheme, RSF may be specified in the 3GPP specification as fixed values (e.g., 3 or another value) or may be provided by higher-layer signaling. For instance, with RSF=0.25, UE 110 may perform one RLM measurement every three times of performing of intra-frequency measurement. Under the proposed scheme, RSF may be used in a variety of scenarios. For illustrative purposes and without limitation, several example scenarios in which RSF may be used are described below.

In a first scenario, RSF (herein denoted as "RSF_a") may be used when the following conditions are met: (i) SSB-based RLM-RS is not overlapped with measurement gap, and (ii) SSB-based RLM-RS is fully overlapped with SMTC (e.g., T_RLM_RS=T_SMTC). In a second scenario. RSF (herein denoted as "RSF_b") may be used when the following conditions are met: (i) SSB-based RLM-RS is partially overlapped with measurement gap, (ii) SSB-based RLM-RS is partially overlapped with SMTC (e.g., T_RLM_RS<T_SMTC), (iii) SMTC is not overlapped with measurement gap, and (iv) when either of the following conditions is met: (a) T_SMTC T_MGRP, and (b) T_SMTC=T_MGRP and T_RLM_RS<0.5*T_SMTC. In a third scenario, RSF (herein denoted as "RSF_c") may be used when the following conditions are met: (i) SSB-based RLM-RS is partially overlapped with measurement gap, (ii) SSB-based RLM-RS is fully overlapped with SMTC (e.g., T_RLM_RS=T_SMTC), and (iii) SMTC is partially overlapped with measurement gap (e.g., T_SMTC<T_MGRP). In a fourth scenario, RSF (herein denoted as "RSF_d") may be used when either of the following conditions is met: (i) SSB-based RLM-RS is fully overlapped with SMTC, or (ii) SSB-based RLM-RS is partially overlapped with both SMTC and MGRP when T_SMTC=T_MG and T_RLM_RS=0.5*T_SMTC.

Under a proposed scheme in accordance with the present disclosure, with respect to an evaluation period of RLM and related UE behavior, in FR1 in an event that RLM-RS is not overlapped with measurement gap the evaluation period may be specified in the 3GPP specification as $T_{evaluation\_period}$. Moreover, in FR2 the evaluation period may be extended by a relaxing factor P and may be expressed mathematically as $P*T_{evaluation\_period}$.

Under a proposed scheme in accordance with the present disclosure, the relaxing factor P may be determined in one of several ways depending on whether RLM-RS and measurement gap is overlapped or partially overlapped as described below.

Under the proposed scheme, the relaxing factor P for evaluation period of RLM in FR2 may be determined based on whether SSB-based RLM-RS is partially or fully overlapped with SMTC. In particular, when SSB-based RLM-RS is partially overlapped with SMTC (e.g., T_RLM_RS<T_SMTC) then P=1/{1−T_RLM_RS/T_SMTC}. Moreover, when SSB-based RLM-RS is fully overlapped with SMTC (e.g., T_RLM_RS=T_SMTC) then P=RSF_a (which is described above).

Under the proposed scheme, the relaxing factor P for evaluation period of RLM may be determined differently when SSB-based RLM-RS is partially overlapped with measurement gap (e.g., T_RLM_RS<T_MGRP) and SSB-based RLM-RS is also partially overlapped with SMTC (e.g., T_RLM_RS<T_SMTC). In particular, when SMTC is not overlapped with measurement gap, P=1/{1−

T_RLM_RS/T_MGRP−T_RLM_RS/T_SMTC}*RSF_b (which is described above) when either of the following conditions is met: (a) T_SMTC≠T_MGRP, and (b) T_SMTC=T_MGRP and T_RLM_RS<0.5*T_SMTC. Moreover, when T_SMTC=T_MGRP and T_RLM_RS=0.5*T_SMTC, P=1/{1−T_RLM_RS/T_MGRP}*RSF_b (which is described above). Alternatively, when SMTC is partially overlapped with measurement gap (e.g., T_SMTC<T_MGRP), P=1/{1−T_RLM_RS/min(T_SMTC, T_MGRP)}.

Under the proposed scheme, when SSB-based RLM-RS is fully overlapped with SMTC (e.g., T_RLM_RS=T_SMTC) and when SMTC is not overlapped with measurement gap, then RLM requirement is not defined. Moreover, when SSB-based RLM-RS is fully overlapped with SMTC (e.g., T_RLM_RS=T_SMTC) and when SMTC is partially overlapped with measurement gap (e.g., T_SMTC<T_MGRP), then P=1/{1−T_RLM_RS/T_MGRP}*RSF_c (which is described above).

It is noteworthy that, while each of RSF_a, RSF_b and RSF_c may be RSF under a respective circumstance or situation, RSF_a, RSF_b and RSF_c may have the same or different values. For illustrative purposes and without limitation, FIG. 2A shows a table of values of the relaxing factor P in FR2, and FIG. 2B shows a table of values of the relaxing factor P in FR1.

Under a proposed scheme in accordance with the present disclosure, behavior of UE 110 for layer 1 (L1) scheduling may differ depending on whether RSF is used. Under the proposed scheme, when RSF is not used, RLM may be performed by UE 110 on the RS, excluding RS overlapping with measurement gap or SMTC. On the other hand, when RSF is used, a set of remaining RS may be determined, excluding RS overlapping with measurement gap. For instance, UE 110 may perform RLM and measurement of intra-frequency without gap measurement on the RS within the set of remaining RS. The ratio of RS to be used by RLM measurement may be according to the RSF. Under the proposed scheme, UE 110 may send an RLM indication to higher layers based on the RLM measurement performed within the evaluation period of RLM.

Figure 3:
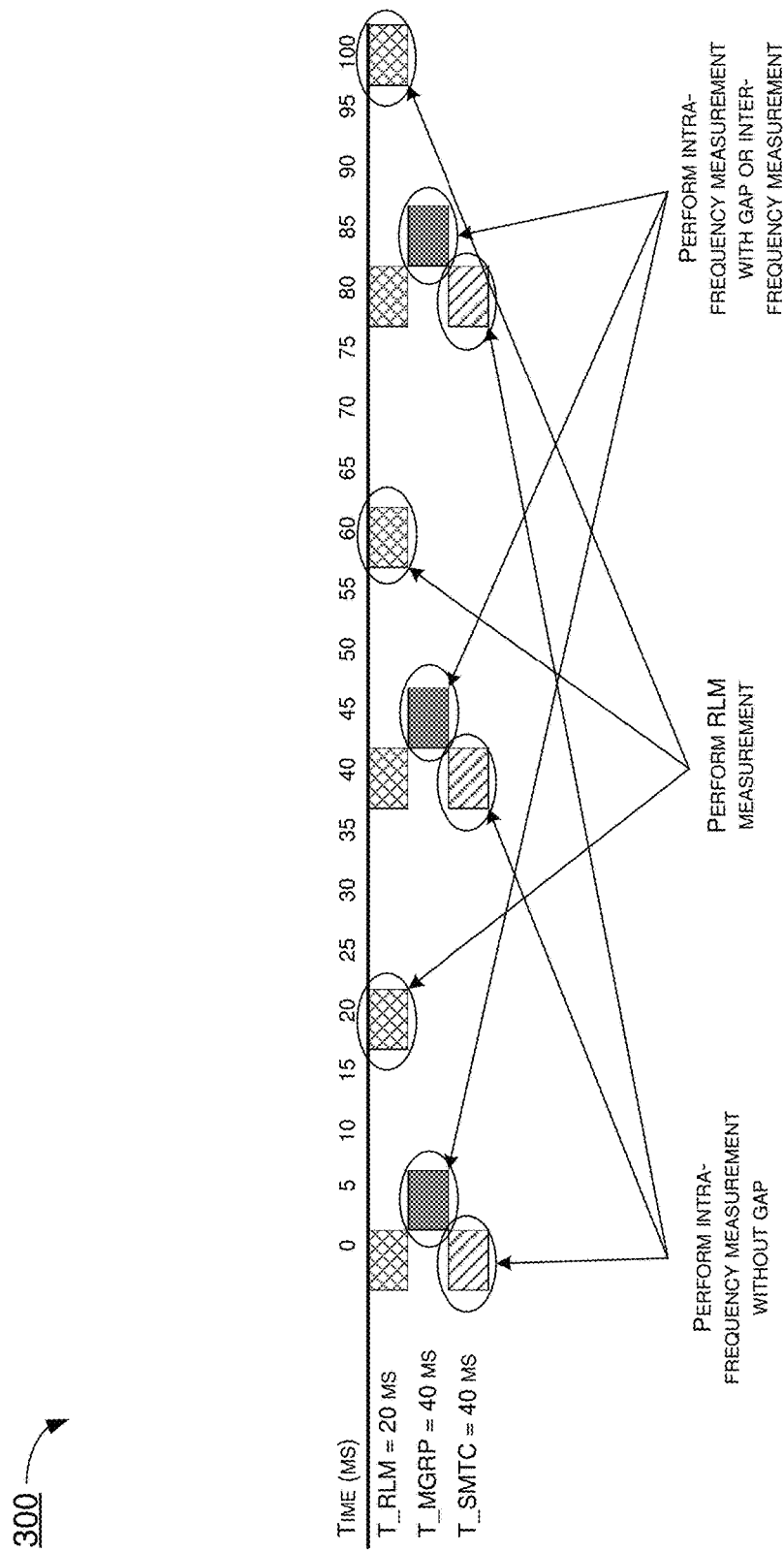
FIG. 3 is a diagram of an example scenario in accordance with an implementation of the present disclosure.

FIG. 3 illustrates an example scenario 300 in accordance with an implementation of the present disclosure. In scenario 300, T_RLM_RS=20 ms, T_SMTC=40 ms and T_MGRP=40 ms. When SSB-based RLM-RS is not overlapped with measurement gap and when SSB-based RLM-RS is partially overlapped with SMTC (e.g., T_RLM_RS<T_SMTC), then P=1/{1−T_RLM_RS/T_SMTC}. Accordingly, the evaluation period may be scaled up by P=2.

Figure 4:
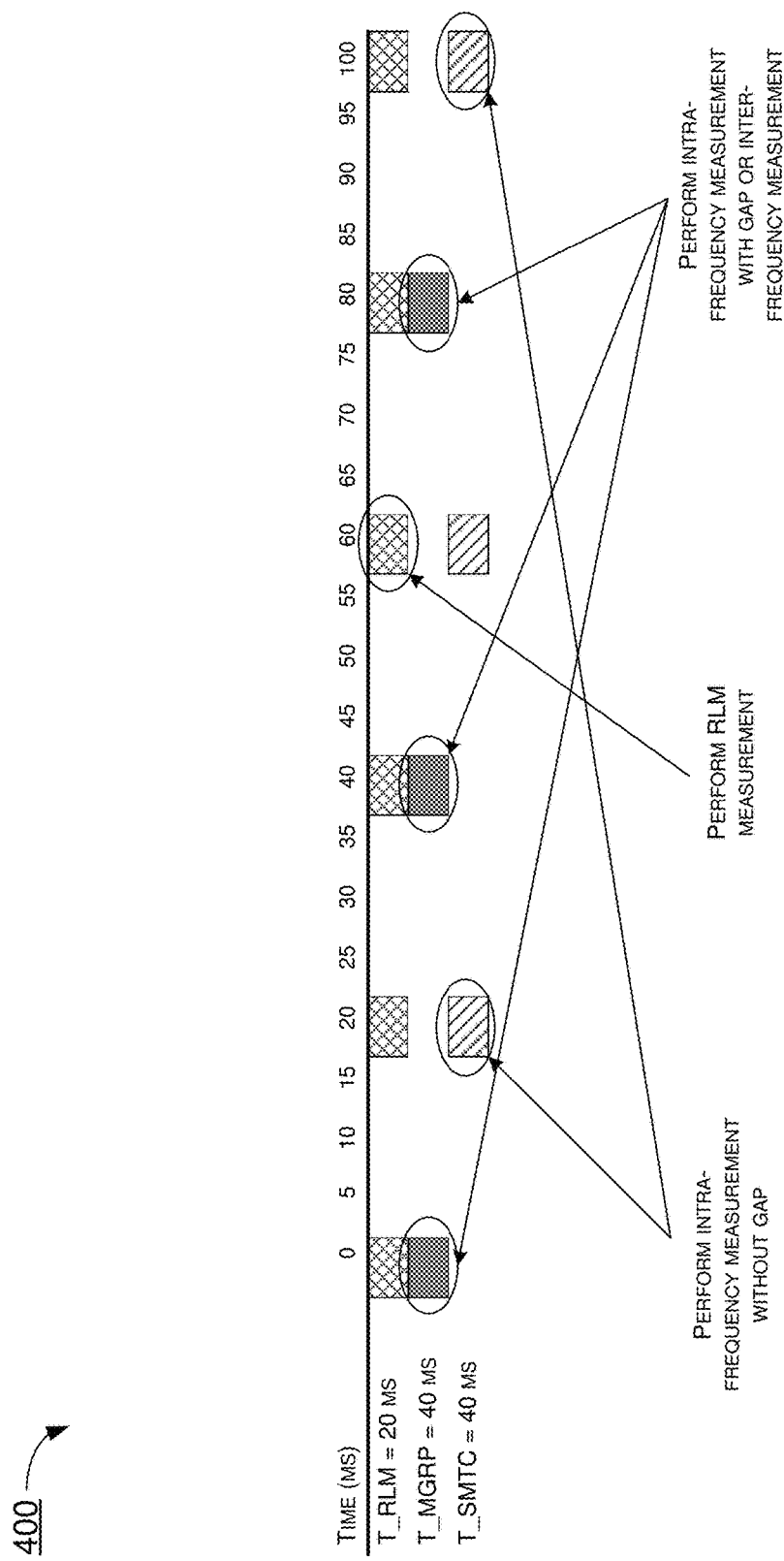
FIG. 4 is a diagram of an example scenario in accordance with an implementation of the present disclosure.

FIG. 4 illustrates an example scenario 400 in accordance with an implementation of the present disclosure. In scenario 400, given the following conditions: (i) SSB-based RLM-RS being partially overlapped with measurement gap (e.g., T_RLM_RS<T_MGRP), (ii) SSB-based RLM-RS being partially overlapped with SMTC (e.g., T_RLM_RS<T_SMTC), (iii) SMTC being not overlapped with measurement gap, and (iv) T_SMTC=T_MGRP and T_RLM_RS=0.5*T_SMTC, P=1/{1−T_RLM_RS/T_MGRP}*RSF_b (which is described above). For instance, with T_RLM_RS=20 ms, T_SMTC=40 ms, T_MGRP=40 ms and RSF_b=2 (e.g., equal sharing between RLM and SMTC), the evaluation period may be scaled up by P=4.

Figure 5:
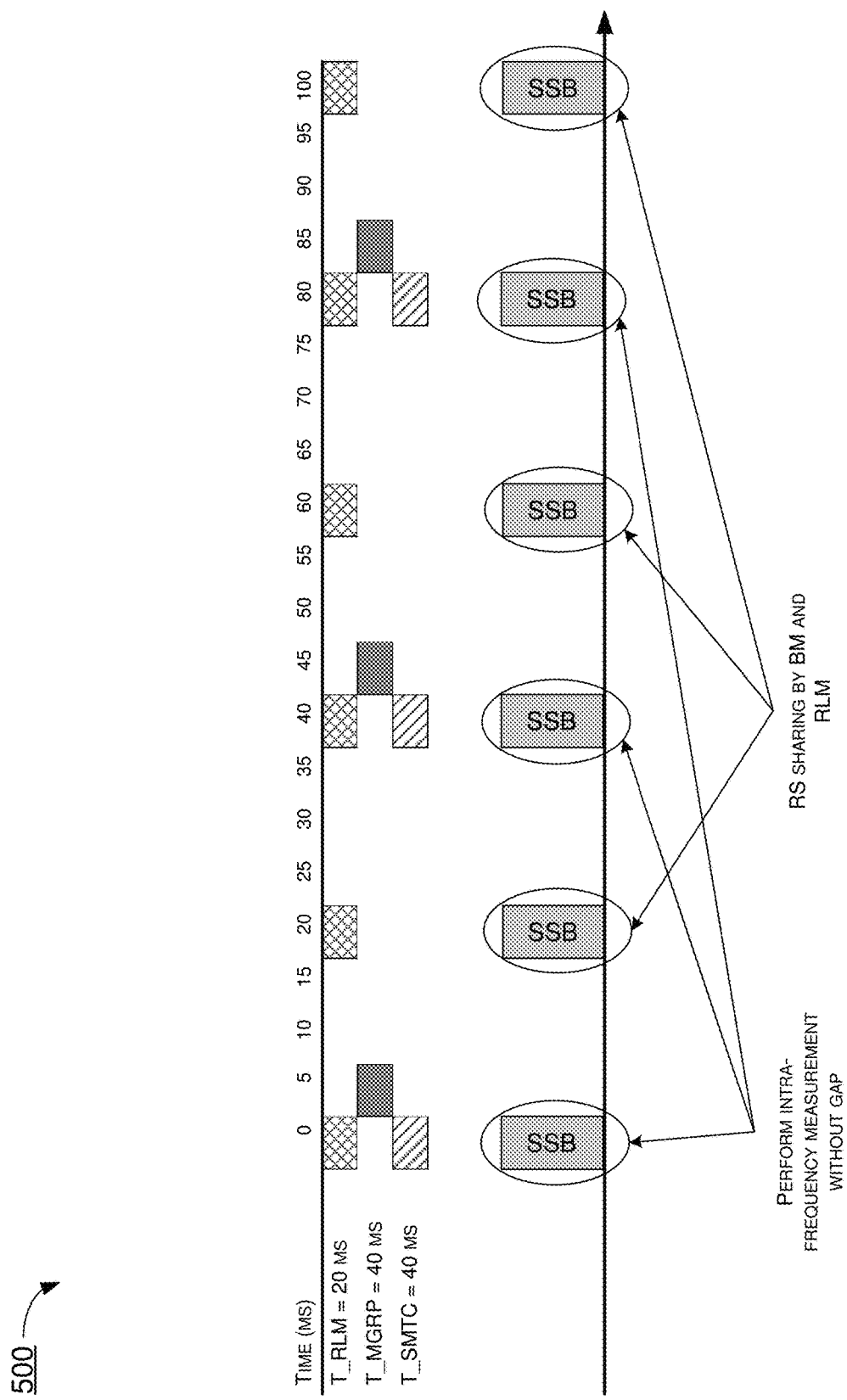
FIG. 5 is a diagram of an example scenario in accordance with an implementation of the present disclosure.

FIG. 5 illustrates an example scenario 500 in accordance with an implementation of the present disclosure. In scenario 500, given the following conditions: (i) SSB-based RLM-RS being not overlapped with measurement gap, (ii) SSB-based RLM-RS being partially overlapped with SMTC (e.g., T_RLM_RS<T_SMTC), P=1/{1−T_RLM_RS/T_SMTC}. For instance, with T_RLM_RS=20 ms, T_SMTC=40 ms and T_MGRP=40 ms, the evaluation period may be scaled up by P=2.

With respect to SSB-based RLM, the SSB may be used for many different tasks such as intra-frequency measurement, beam management (BM), beam failure detection, and RLM. The RX beam sweeping may be performed in some tasks so that RX beam sweeping may not need to be performed during RLM measurement. Since the quasi co-location (QCL) information of SSB may be assumed to be the same when the SSB has the same service based interface (SBI), in an event that RX beams have been determined for the SSB configured for RLM, then the RX beam sweeping may not be necessary. For a given SSB, the RX beams may be determined by the following: SSB-based radio resource management (RRM), SSB-based BM, and CSI-RS-based BM.

In an event that RX beam information can be provided by SSB-based RRM (case 1), UE 110 may be able to roughly determine its RX beams. However, the RX beam(s) used for RRM may be different from the RX beam(s) used for RLM. UE 110 may use wider RX beam(s) to cover SSBs from different/neighboring cells for RRM. However, for RLM and data reception, UE 110 may need some opportunity to refine the RX beams to optimize its link quality.

Regarding the case of SSB-based BM (case 2), since both BM and RLM are related to the serving cell, the same RX beam(s) may be used. However, if the RX beam determination relies on SSB-based BM, it may take some time for BM to figure the RX beam, and the evaluation period of SSB-based RLM may be extended, as shown in FIG. 5, since it requires some time for BM to sweep RX beam(s) on those SSBs.

In case that RX beam information can be provided by CSI-RS-based BM (case 3), UE 110 may be able to determine its RX beam for serving cell accordingly. Therefore, the evaluation period of SSB-based RLM may not be extended for RX beam sweeping, when the following conditions are met: (i) all SSBs configured for RLM being spatially quasi co-located to CSI-RS resources configured for BM, (ii) the QCL association being provided, and (iii) the CSI-RS resources being time-division multiplexed with the SSBs.

With respect to CSI-RS-based RLM, for a given CSI-RS resource, RX beams may be determined by the following: SSB-based RRM, SSB-based BM, and CSI-RS-based BM. For case 1, similar observation may be obtained as in SSB-based RLM, since the RX beam(s) used for RRM may be different from the RX beam(s) used for RLM. UE 110 may need an opportunity to refine the RX beams for data reception, and the evaluation period of RLM may be extended. For case 2, similar observation may be obtained as in SSB-based RLM, in an event that all CSI-RS resources configured for RLM are spatially quasi co-located to SSB configured for BM, and that CSI-RS resources are time-division multiplexed with the SSBs, then the evaluation period may not be needed for RX beam sweeping when the QCL association is provided. For case 3, in an event that CSI-RS resources configured for RLM are quasi co-located and time-division multiplexed with the CSI-RS resources configured for BM, then the evaluation period may not be needed for RX beam sweeping when the QCL association is provided.

Under a proposed scheme in accordance with the present disclosure, evaluation period for RX beam sweeping may be relaxed. Under the proposed scheme, for SSB-based RLM in FR2, evaluation period for RX beam sweeping may be relaxed when the following conditions are met: (i) all SSBs configured for RLM being spatially quasi co-located and time-division multiplexed to CSI-RS resources configured for BM, and (ii) QCL association being provided. Otherwise, a relaxing factor M for RX beam sweeping may be introduced for the evaluation period.

Under the proposed scheme, for CSI-RS-based RLM in FR2, evaluation period for RX beam sweeping may be relaxed when the following conditions are met: (i) all CSI-RS resources configured for RLM being quasi co-located and time-division multiplexed with the CSI-RS resources configured for BM or SSBs configured for SSBs, and (ii) QCL association being provided. Otherwise, a relaxing factor M for RX beam sweeping may be introduced for the evaluation period.

Under the proposed scheme, in FR2, with RX beam sweeping, the evaluation period may be extended by a relaxing period P and RX beam relaxing factor M, and may be expressed mathematically as $P*T_{evaluation\_period}*M$.

Illustrative Implementations

Figure 6:
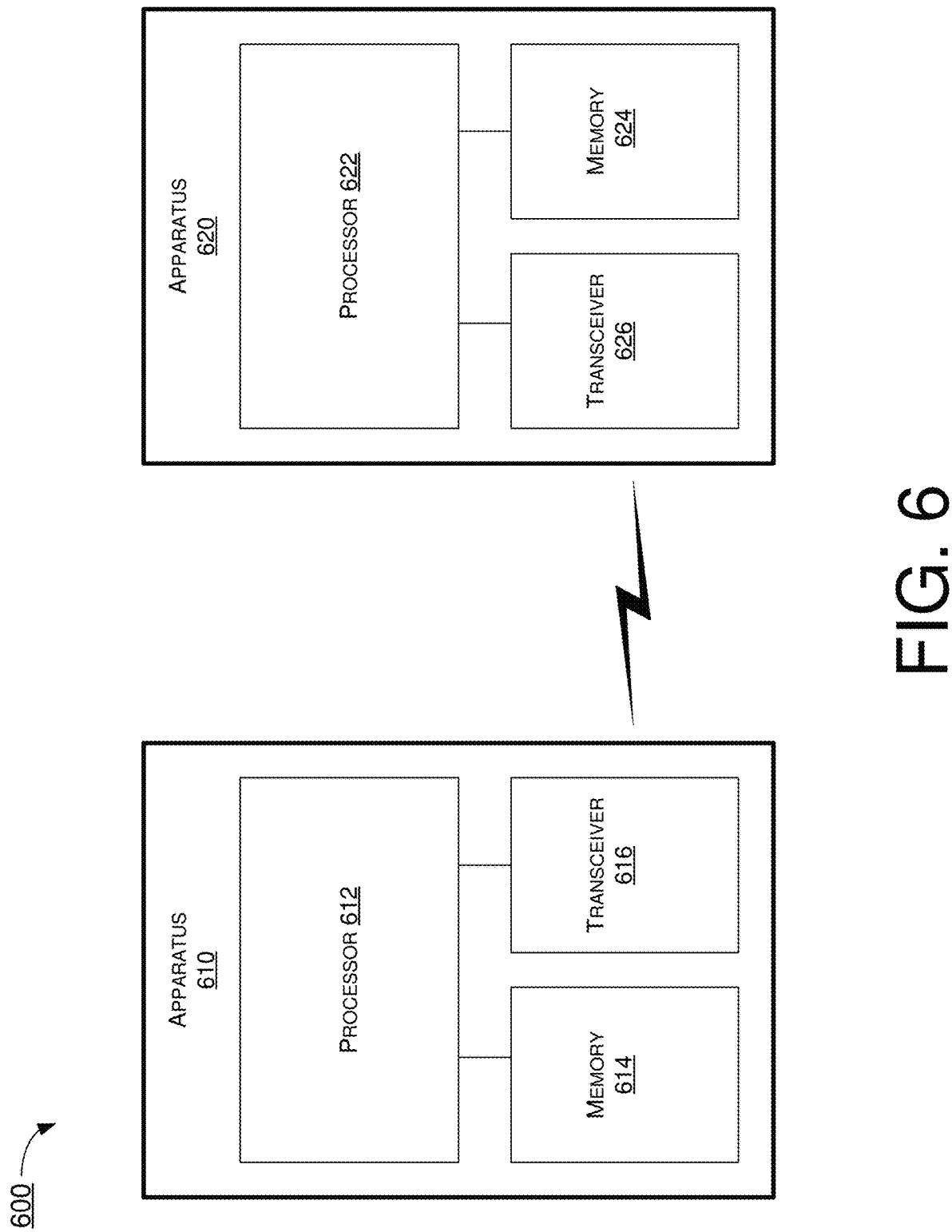
FIG. 6 is a block diagram of an example system in accordance with an implementation of the present disclosure.

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to conditional extension of evaluation period for RLM in NR mobile communications, including the various schemes described above with respect to various proposed designs, concepts, schemes, systems and methods described above as well as process 600 described below. For instance, apparatus 610 may be an example implementation of UE 110, and apparatus 620 may be an example implementation of network node 125.

Each of apparatus 610 and apparatus 620 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 610 and apparatus 620 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 610 and apparatus 620 may be implemented in or as a network apparatus or a UE. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to conditional extension of evaluation period for RLM in NR mobile communications in accordance with various implementations of the present disclosure.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as a UE, and apparatus 620, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 610 as a UE (e.g., UE 110), the same is also applicable to apparatus 620 as a network node or base station such as a gNB, TRP or eNodeB (e.g., network node 125) of a wireless network (e.g., wireless network 120) such as a 5G NR mobile network.

Under a proposed scheme in accordance with the present disclosure, processor 612 of apparatus 610 may perform, via transceiver 616, radio link monitoring (RLM) with respect to a radio link with a cell of a wireless network (e.g., via apparatus 620). Additionally, processor 612 may detect, via transceiver 616, radio link failure (RLF) based on the RLM. Furthermore, processor 612 may perform, via transceiver 616, one or more operations to attempt to recover the radio link with the cell responsive to the detecting. In performing the RLM, processor 612 may determine whether an RLM-RS is overlapped with one or more other reference signals. Moreover, processor 612 may extend an evaluation period for the RLM responsive to a result of the determining indicating that the RLM-RS is at least partially overlapped with the one or more other reference signals.

In some implementations, in performing the RLM, processor 612 may perform an SSB-based RLM or a CSI-RS-based RLM.

In some implementations, in extending the evaluation period for the RLM, processor 612 may extend the evaluation period for the RLM in the first frequency range (FR1) responsive to the RLM being partially or fully overlapped with a measurement gap. Alternatively, or additionally, in extending the evaluation period for the RLM, processor 612 may extend the evaluation period for the RLM in the second frequency range (FR2) responsive to the RLM being partially or fully overlapped with a measurement gap or the RLM being partially or fully overlapped with a SMTC with respect to the cell of the wireless network.

In some implementations, in extending the evaluation period for the RLM, processor 612 may extend the evaluation period for the RLM based on a periodicity of the RLM-RS or a predetermined value (e.g., the RSF as described above, which may be 3 or another value).

In some implementations, in extending the evaluation period for the RLM, processor 612 may extend the evaluation period for the RLM by a relaxing factor P responsive to the RLM being partially overlapped with the measurement gap in FR1 as defined in the 3GPP specification. In such cases, extended evaluation period=$P*T_{evaluation\_period}$, $P=1/(1-T\_RLM\_RS/T\_MGRP)$, $T\_RLM\_RS<T\_MGRP$, $T_{evaluation\_period}$ denotes the evaluation period, P denotes the relaxing factor, T_RLM_RS denotes a periodicity of the SSB, and T_MGRP denotes a periodicity of a measurement gap repetition period.

In some implementations, in extending the evaluation period for the RLM, processor 612 may extend the evaluation period for the RLM by a relaxing factor P responsive to the RLM being partially overlapped with the SMTC but not overlapped with the measurement gap in FR2 as defined in the 3GPP specification. In such cases, extended evaluation period=$P*T_{evaluation\_period}$, $P=1/(1-T\_RLM\_RS/T\_SMTC)$, $T\_RLM\_RS<T\_SMTC$, $T_{evaluation\_period}$ denotes the evalu-ation period, P denotes the relaxing factor, T_RLM_RS denotes a periodicity of the SSB, and T_SMTC denotes a periodicity of the SMTC.

In some implementations, in extending the evaluation period for the RLM, processor 612 may extend the evaluation period for the RLM by a relaxing factor P responsive to the RLM being fully overlapped with the SMTC but not overlapped with the measurement gap in FR2 as defined in the 3GPP specification. In such cases, P may be equal to a sharing factor (e.g., the RSF as described above, which may be 3 or another value).

In some implementations, in extending the evaluation period for the RLM, processor 612 may extend the evaluation period for the RLM by a relaxing factor P responsive to the RLM being partially overlapped with each of the SMTC and the measurement gap while the SMTC and the measurement gap are not overlapped in FR2 as defined in the 3GPP specification. In such cases, extended evaluation period=$P*T_{evaluation\_period}$, $P=1/(1-T\_RLM\_RS/T\_MGRP-T\_RLM\_RS/T\_SMTC)$, either (a) T_SMTC≠T_MGRP or (b) T_SMTC=T_MGRP and T_RLM_RS<0.5*T_SMTC, $T_{evaluation\_period}$ denotes the evaluation period, P denotes the relaxing factor, T_RLM_RS denotes a periodicity of the SSB, T_MGRP denotes a periodicity of a measurement gap repetition period, and T_SMTC denotes a periodicity of the SMTC.

In some implementations, in extending the evaluation period for the RLM, processor 612 may extend the evaluation period for the RLM by a relaxing factor P responsive to the RLM being partially overlapped with each of the SMTC and the measurement gap while the SMTC and the measurement gap are not overlapped in FR2 as defined in the 3GPP specification. In such cases, extended evaluation period=$P*T_{evaluation\_period}$, $P=RSF*1/[(1-T\_RLM\_RS/T\_MGRP)]$, T_SMTC=T_MGRP, T_RLM_RS=0.5*T_SMTC, $T_{evaluation\_period}$ denotes the evaluation period, P denotes the relaxing factor, RSF denotes the RLM sharing factor, T_RLM_RS denotes a periodicity of the SSB, T_MGRP denotes a periodicity of a measurement gap repetition period, and T_SMTC denotes a periodicity of the SMTC.

In some implementations, in extending the evaluation period for the RLM, processor 612 may extend the evaluation period for the RLM by a relaxing factor P responsive to the RLM being partially overlapped with each of the SMTC and the measurement gap while the SMTC and the measurement gap are partially overlapped in FR2 as defined in the 3GPP specification. In such cases, extended evaluation period=$P*T_{evaluation\_period}$, $P=1/[1-T\_RLM\_RS/\min(T\_SMTC, T\_MGRP)]$, $T\_RLM\_RS<T\_SMTC$, $T_{evaluation\_period}$ denotes the evaluation period, P denotes the relaxing factor, T_RLM_RS denotes a periodicity of the SSB, T_MGRP denotes a periodicity of a measurement gap repetition period, and T_SMTC denotes a periodicity of the SMTC.

In some implementations, in extending the evaluation period for the RLM, processor 612 may extend the evaluation period for the RLM by a relaxing factor P responsive to the RLM being partially overlapped with the measurement gap and fully overlapped with the SMTC while the SMTC and the measurement gap are partially overlapped in FR2 as defined in the 3GPP specification. In such cases, extended evaluation period=$P*T_{evaluation\_period}$, $P=RSF*1/[(1-T\_RLM\_RS/T\_MGRP)]$, $T\_SMTC<T\_MGRP$, $T\_RLM\_RS=T\_SMTC$, $T_{evaluation\_period}$ denotes the evaluation period, P denotes the relaxing factor, RSF denotes the RLM sharing factor, T_RLM_RS denotes a periodicity of the SSB, T_MGRP denotes a periodicity of a measurement gap repetition period, and T_SMTC denotes a periodicity of the SMTC.

In some implementations, in extending the evaluation period for the RLM, processor 612 may perform, via transceiver 616, various operations. For instance, processor 612 may determine an RSF. Moreover, processor 612 may share resources between a SMTC and the RLM-RS based on the RSF which has a predetermined value (e.g., 3 or another value).

In some implementations, in sharing the resources between the SMTC and the RLM-RS, processor 612 may share the resources between the SMTC and the RLM-RS responsive to either: (a) the RLM being fully overlapped with the SMTC; or (b) the RLM being partially overlapped with either the SMTC or a measurement gap while a periodicity of the RLM-RS is equal to half of a periodicity of the SMTC which is equal to a periodicity of the measurement gap (e.g., T_SMTC=T_MG and T_RLM_RS=0.5*T_SMTC).

Illustrative Processes

Figure 7:
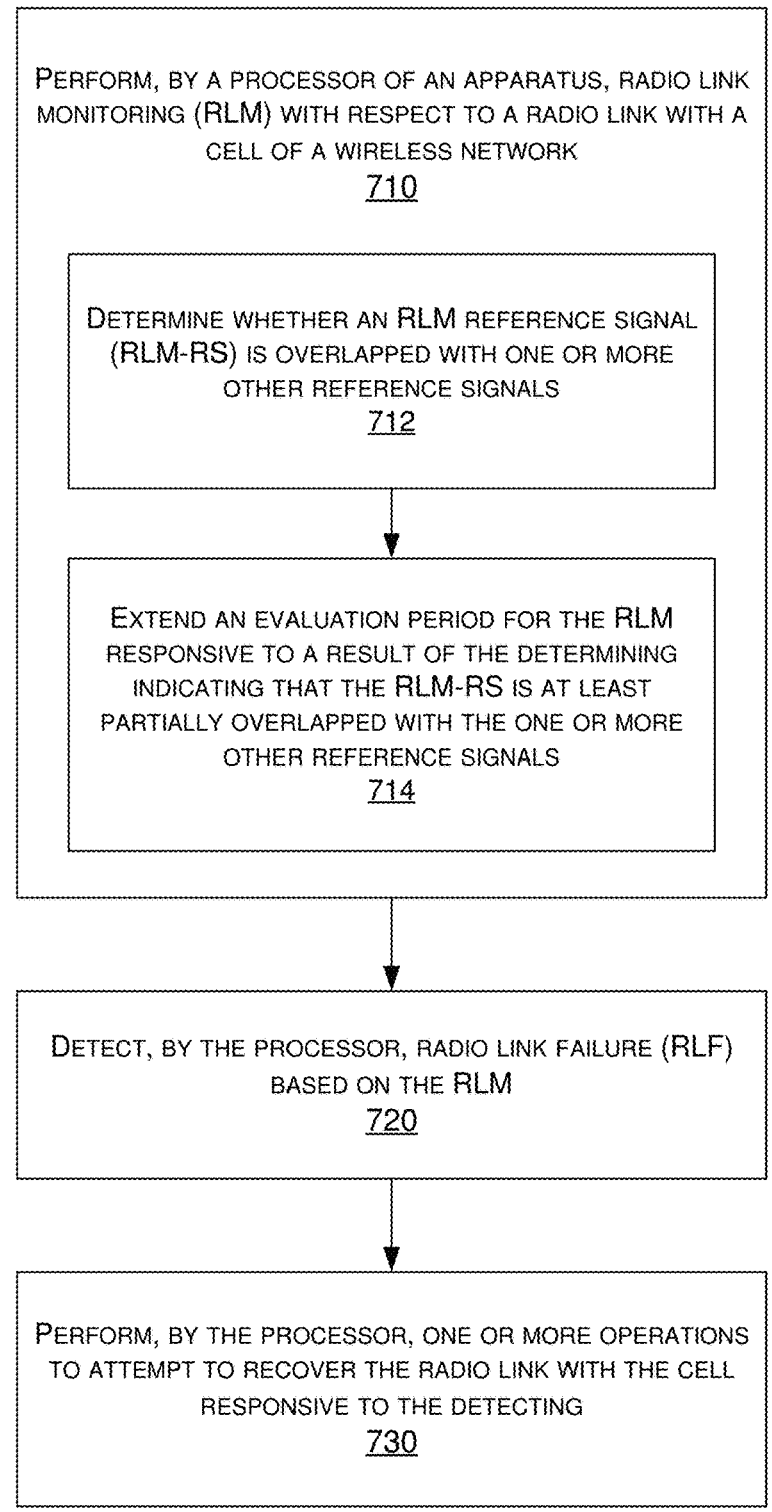
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to conditional extension of evaluation period for RLM in NR mobile communications in accordance with the present disclosure. Process 700 may include one or more operations, actions, or functions as illustrated by one or more of blocks 710, 720 and 730 as well as sub-blocks 712 and 714. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 as a UE (e.g., UE 110) and apparatus 620 as a network node (e.g., network node 125) of a wireless network (e.g., wireless network 120) such as a 5G/NR mobile network. Process 700 may begin at block 710.

At 710, process 700 may involve processor 612 of apparatus 610 performing, via transceiver 616, RLM with respect to a radio link with a cell of a wireless network (e.g., via apparatus 620). Process 700 may proceed from 710 to 720.

At 720, process 700 may involve processor 612 detecting, via transceiver 616, RLF based on the RLM. Process 700 may proceed from 720 to 730.

At 730, process 700 may involve processor 612 performing, via transceiver 616, one or more operations to attempt to recover the radio link with the cell responsive to the detecting.

In performing the RLM, process 700 may involve processor 612 performing various operations as represented by 712 and 714.

At 712, process 700 may involve processor 612 determining whether an RLM-RS is overlapped with one or more other reference signals. Process 700 may proceed from 712 to 714.

At 714, process 700 may involve processor 612 extending an evaluation period for the RLM responsive to a result of the determining indicating that the RLM-RS is at least partially overlapped with the one or more other reference signals.

In some implementations, in performing the RLM, process 700 may involve processor 612 performing an SSB-based RLM or a CSI-RS-based RLM.

In some implementations, in extending the evaluation period for the RLM, process 700 may involve processor 612 extending the evaluation period for the RLM in the first frequency range (FR1) responsive to the RLM being partially or fully overlapped with a measurement gap. Alternatively, or additionally, in extending the evaluation period for the RLM, process 700 may involve processor 612 extending the evaluation period for the RLM in the second frequency range (FR2) responsive to the RLM being partially or fully overlapped with a measurement gap or the RLM being partially or fully overlapped with a SMTC with respect to the cell of the wireless network.

In some implementations, in extending the evaluation period for the RLM, process 700 may involve processor 612 extending the evaluation period for the RLM based on a periodicity of the RLM-RS or a predetermined value (e.g., the RSF as described above, which may be 3 or another value).

In some implementations, in extending the evaluation period for the RLM, process 700 may involve processor 612 extending the evaluation period for the RLM by a relaxing factor P responsive to the RLM being partially overlapped with the measurement gap in FR1 as defined in the 3GPP specification. In such cases, extended evaluation period=$P*T_{evaluation\_period}$, $P=1/(1-T\_RLM\_RS/T\_MGRP)$, $T\_RLM\_RS<T\_MGRP$, $T_{evaluation\_period}$ denotes the evaluation period, P denotes the relaxing factor, T_RLM_RS denotes a periodicity of the SSB, and T_MGRP denotes a periodicity of a measurement gap repetition period.

In some implementations, in extending the evaluation period for the RLM, process 700 may involve processor 612 extending the evaluation period for the RLM by a relaxing factor P responsive to the RLM being partially overlapped with the SMTC but not overlapped with the measurement gap in FR2 as defined in the 3GPP specification. In such cases, extended evaluation period=$P*T_{evaluation\_period}$, $P=1/(1-T\_RLM\_RS/T\_SMTC)$, $T\_RLM\_RS<T\_SMTC$, $T_{evaluation\_period}$ denotes the evaluation period, P denotes the relaxing factor, T_RLM_RS denotes a periodicity of the SSB, and T_SMTC denotes a periodicity of the SMTC.

In some implementations, in extending the evaluation period for the RLM, process 700 may involve processor 612 extending the evaluation period for the RLM by a relaxing factor P responsive to the RLM being fully overlapped with the SMTC but not overlapped with the measurement gap in FR2 as defined in the 3GPP specification. In such cases, P may be equal to a sharing factor (e.g., the RSF as described above, which may be 3 or another value).

In some implementations, in extending the evaluation period for the RLM, process 700 may involve processor 612 extending the evaluation period for the RLM by a relaxing factor P responsive to the RLM being partially overlapped with each of the SMTC and the measurement gap while the SMTC and the measurement gap are not overlapped in FR2 as defined in the 3GPP specification. In such cases, extended evaluation period=$P*T_{evaluation\_period}$, $P=1/(1-T\_RLM\_RS/T\_MGRP-T\_RLM\_RS/T\_SMTC)$, either (a) $T\_SMTC \ne T\_MGRP$ or (b) $T\_SMTC=T\_MGRP$ and $T\_RLM\_RS<0.5*T\_SMTC$, $T_{evaluation\_period}$ denotes the evaluation period, P denotes the relaxing factor, $T\_RLM\_RS$ denotes a periodicity of the SSB, $T\_MGRP$ denotes a periodicity of a measurement gap repetition period, and $T\_SMTC$ denotes a periodicity of the SMTC.

In some implementations, in extending the evaluation period for the RLM, process 700 may involve processor 612 extending the evaluation period for the RLM by a relaxing factor P responsive to the RLM being partially overlapped with each of the SMTC and the measurement gap while the SMTC and the measurement gap are not overlapped in FR2 as defined in the 3GPP specification. In such cases, extended evaluation period=$P*T_{evaluation\_period}$, $P=RSF*1/[(1-T\_RLM\_RS/T\_MGRP)]$, $T\_SMTC=T\_MGRP$, $T\_RLM\_RS=0.5*T\_SMTC$, $T_{evaluation\_period}$ denotes the evaluation period, P denotes the relaxing factor, RSF denotes the RLM sharing factor, $T\_RLM\_RS$ denotes a periodicity of the SSB, $T\_MGRP$ denotes a periodicity of a measurement gap repetition period, and $T\_SMTC$ denotes a periodicity of the SMTC.

In some implementations, in extending the evaluation period for the RLM, process 700 may involve processor 612 extending the evaluation period for the RLM by a relaxing factor P responsive to the RLM being partially overlapped with each of the SMTC and the measurement gap while the SMTC and the measurement gap are partially overlapped in FR2 as defined in the 3GPP specification. In such cases, extended evaluation period=$P*T_{evaluation\_period}$, $P=1/[1-T\_RLM\_RS/min(T\_SMTC, T\_MGRP)]$, $T\_RLM\_RS<T\_SMTC$, $T_{evaluation\_period}$ denotes the evaluation period, P denotes the relaxing factor, $T\_RLM\_RS$ denotes a periodicity of the SSB, $T\_MGRP$ denotes a periodicity of a measurement gap repetition period, and $T\_SMTC$ denotes a periodicity of the SMTC.

In some implementations, in extending the evaluation period for the RLM, process 700 may involve processor 612 extending the evaluation period for the RLM by a relaxing factor P responsive to the RLM being partially overlapped with the measurement gap and fully overlapped with the SMTC while the SMTC and the measurement gap are partially overlapped in FR2 as defined in the 3GPP specification. In such cases, extended evaluation period=$P*T_{evaluation\_period}$, $P=RSF*1/[(1-T\_RLM\_RS/T\_MGRP)]$, $T\_SMTC<T\_MGRP$, $T\_RLM\_RS=T\_SMTC$, $T_{evaluation\_period}$ denotes the evaluation period, P denotes the relaxing factor, RSF denotes the RLM sharing factor, $T\_RLM\_RS$ denotes a periodicity of the SSB, $T\_MGRP$ denotes a periodicity of a measurement gap repetition period, and $T\_SMTC$ denotes a periodicity of the SMTC.

In some implementations, in extending the evaluation period for the RLM, process 700 may involve processor 612 performing, via transceiver 616, various operations. For instance, process 700 may involve processor 612 determining an RSF. Moreover, process 700 may involve processor 612 sharing resources between a SMTC and the RLM-RS based on the RSF which has a predetermined value (e.g., 3 or another value).

In some implementations, in sharing the resources between the SMTC and the RLM-RS, process 700 may involve processor 612 sharing the resources between the SMTC and the RLM-RS responsive to either: (a) the RLM being fully overlapped with the SMTC; or (b) the RLM being partially overlapped with either the SMTC or a measurement gap while a periodicity of the RLM-RS is equal to half of a periodicity of the SMTC which is equal to a periodicity of the measurement gap (e.g., $T\_SMTC=T\_MG$ and $T\_RLM\_RS=0.5*T\_SMTC$).

Figure 8:
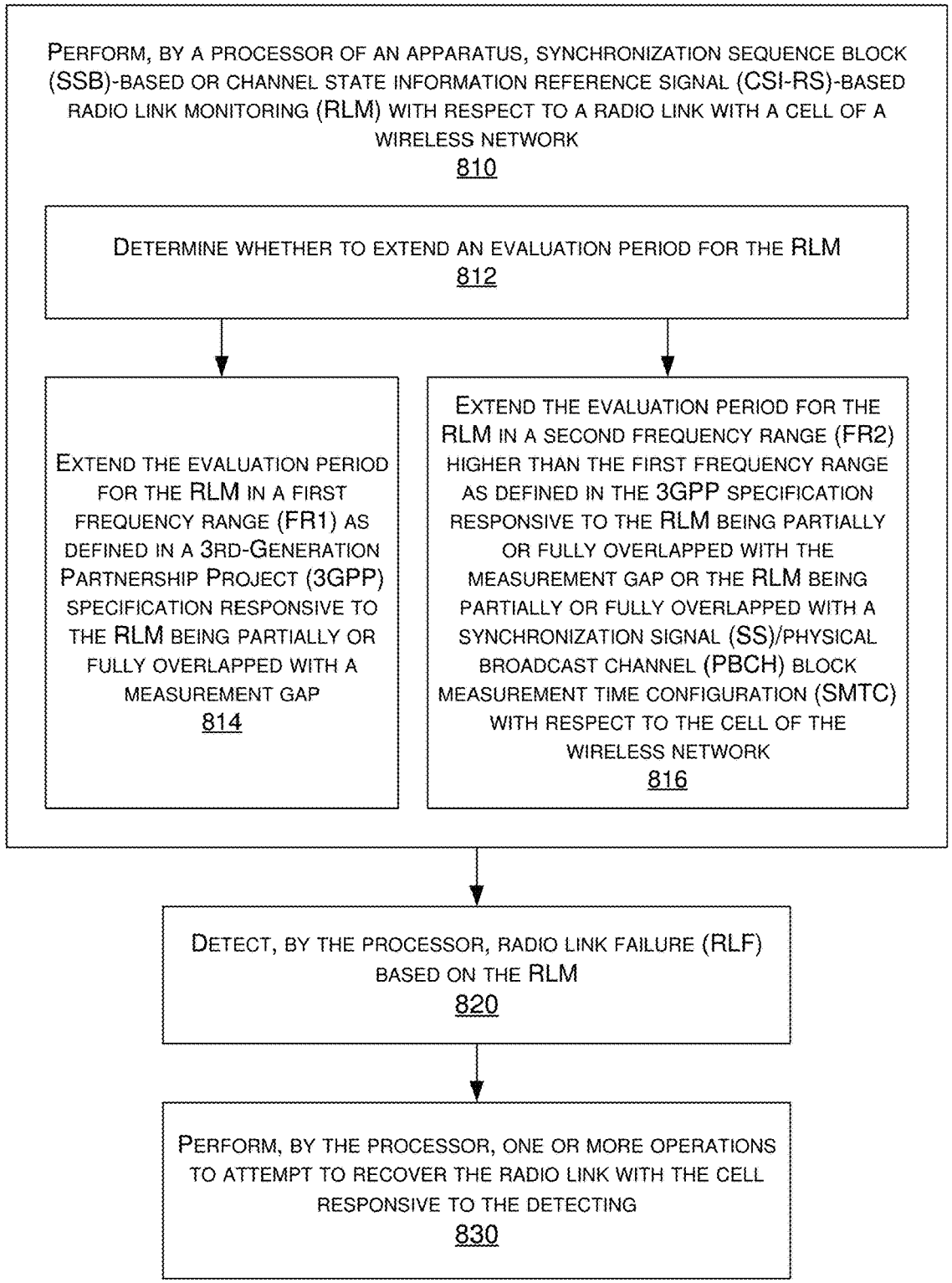
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to conditional extension of evaluation period for RLM in NR mobile communications in accordance with the present disclosure. Process 800 may include one or more operations, actions, or functions as illustrated by one or more of blocks 810, 820 and 830 as well as sub-blocks 812, 814 and 816. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative purposes and without limiting the scope, process 800 is described below in the context of apparatus 610 as a UE (e.g., UE 110) and apparatus 620 as a network node (e.g., network node 125) of a wireless network (e.g., wireless network 120) such as a 5G/NR mobile network. Process 800 may begin at block 810.

At 810, process 800 may involve processor 612 of apparatus 610 performing, via transceiver 616, SSB-based or CSI-RS-based RLM with respect to a radio link with a cell of a wireless network (e.g., via apparatus 620). Process 800 may proceed from 810 to 820.

At 820, process 800 may involve processor 612 detecting, via transceiver 616, RLF based on the RLM. Process 800 may proceed from 820 to 830.

At 830, process 800 may involve processor 612 performing, via transceiver 616, one or more operations to attempt to recover the radio link with the cell responsive to the detecting.

In performing the RLM, process 800 may involve processor 612 performing various operations as represented by 812, 814 and 816.

At 812, process 800 may involve processor 612 determining whether to extend an evaluation period for the RLM. Process 800 may proceed from 812 to 814 or 816.

At 814, process 800 may involve processor 612 extending the evaluation period for the RLM in a first frequency range (FR1) as defined in the 3GPP specification responsive to the RLM being partially or fully overlapped with a measurement gap.

At 816, process 800 may involve processor 612 extending the evaluation period for the RLM in a second frequency range (FR2) higher than the first frequency range as defined in the 3GPP specification responsive to the RLM being partially or fully overlapped with the measurement gap or the RLM being partially or fully overlapped with a SMTC with respect to the cell of the wireless network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   performing, by a processor of an apparatus, radio link monitoring (RLM) with respect to a radio link with a cell of a wireless network, the performing of the RLM comprising:
   determining whether an RLM reference signal (RLM-RS) is overlapped with either or both of a measurement gap and a synchronization signal (SS)/physical broadcast channel (PBCH) block measurement time configuration (SMTC); and
   extending an evaluation period for the RLM based on a periodicity of the RLM-RS or an RLM sharing factor responsive to a result of the determining indicating that the RLM-RS is at least partially overlapped with either or both of the measurement gap and the SMTC,
   wherein the RLM sharing factor is a predetermined value,
   wherein the extending of the evaluation period for the RLM comprises extending the evaluation period for the RLM by a relaxing factor P responsive to the RLM-RS being partially overlapped with the SMTC but not overlapped with the measurement gap in a second frequency range (FR2) which is higher than a first frequency range (FR1), and
   wherein:

extended evaluation period=$P*T_{evaluation\_period}$, $P=1/(1-T\_RLM\_RS/T\_SMTC)$, $T\_RLM\_RS<T\_SMTC$, $T_{evaluation\_period}$ denotes the evaluation period,
   P denotes the relaxing factor,
   T_RLM_RS denotes the periodicity of the RLM-RS, and
   T_SMTC denotes a periodicity of the SMTC.

2. The method of claim 1, wherein the performing of the RLM comprises performing a synchronization sequence block (SSB)-based RLM or a channel state information reference signal (CSI-RS)-based RLM.

3. The method of claim 1, wherein the extending of the evaluation period for the RLM further comprises:
   extending the evaluation period for the RLM in the FR1 responsive to the RLM-RS being partially or fully overlapped with the measurement gap; or
   extending the evaluation period for the RLM in the FR2 responsive to the RLM-RS being partially or fully overlapped with the measurement gap or the RLM-RS being partially or fully overlapped with the SMTC with respect to the cell of the wireless network.

4. The method of claim 1, wherein the extending of the evaluation period for the RLM further comprises extending the evaluation period for the RLM by a relaxing factor P responsive to the RLM-RS being partially overlapped with the measurement gap in the FR1, and wherein:

extended evaluation period=$P*T_{evaluation\_period}$, $P=1/(1-T\_RLM\_RS/T\_MGRP)$, $T\_RLM\_RS<T\_MGRP$, $T_{evaluation\_period}$ denotes the evaluation period,
P denotes the relaxing factor,
T_RLM_RS denotes the periodicity of the RLM-RS, and
T_MGRP denotes a periodicity of a measurement gap repetition period.

5. The method of claim 1, wherein the extending of the evaluation period for the RLM further comprises extending the evaluation period for the RLM by a relaxing factor P responsive to the RLM-RS being fully overlapped with the SMTC but not overlapped with the measurement gap in the FR2, and wherein P is equal to the RLM sharing factor.

6. The method of claim 1, wherein the extending of the evaluation period for the RLM further comprises extending the evaluation period for the RLM by a relaxing factor P responsive to the RLM-RS being partially overlapped with each of the SMTC and the measurement gap while the SMTC and the measurement gap are not overlapped in the FR2, and wherein:

extended evaluation period=$P*T_{evaluation\_period}$, $P=1/(1-T\_RLM\_RS/T\_MGRP-T\_RLM\_RS/T\_SMTC)$, either:

$T\_SMTC \neq T\_MGRP$ or $T\_SMTC=T\_MGRP$ and $T\_RLM\_RS<0.5*T\_SMTC$, $T_{evaluation\_period}$ denotes the evaluation period,
P denotes the relaxing factor,
T_RLM_RS denotes the periodicity of the RLM-RS,
T_MGRP denotes a periodicity of a measurement gap repetition period, and
T_SMTC denotes a periodicity of the SMTC.

7. The method of claim 1, wherein the extending of the evaluation period for the RLM further comprises extending the evaluation period for the RLM by a relaxing factor P responsive to the RLM-RS being partially overlapped with each of the SMTC and the measurement gap while the SMTC and the measurement gap are not overlapped in the FR2, and wherein:

extended evaluation period=$P*T_{evaluation\_period}$, $P=RSF*1/[(1-T\_RLM\_RS/T\_MGRP)]$, $T\_SMTC=T\_MGRP$, $T\_RLM\_RS=0.5*T\_SMTC$, $T_{evaluation\_period}$ denotes the evaluation period,
P denotes the relaxing factor,
RSF denotes the RLM sharing factor,
T_RLM_RS denotes the periodicity of the RLM-RS,
T_MGRP denotes a periodicity of a measurement gap repetition period, and
T_SMTC denotes a periodicity of the SMTC.

8. The method of claim 1, wherein the extending of the evaluation period for the RLM further comprises extending the evaluation period for the RLM by a relaxing factor P responsive to the RLM-RS being partially overlapped with each of the SMTC and the measurement gap while the SMTC and the measurement gap are partially overlapped in the FR2, and wherein:

extended evaluation period=$P*T_{evaluation\_period}$, $P=1/[1-T\_RLM\_RS/\min(T\_SMTC,T\_MGRP)]$, $T\_RLM\_RS<T\_SMTC$, $T_{evaluation\_period}$ denotes the evaluation period,
P denotes the relaxing factor,
T_RLM_RS denotes the periodicity of the RLM-RS,
T_MGRP denotes a periodicity of a measurement gap repetition period, and
T_SMTC denotes a periodicity of the SMTC.

9. The method of claim 1, wherein the extending of the evaluation period for the RLM further comprises extending the evaluation period for the RLM by a relaxing factor P responsive to the RLM-RS being partially overlapped with the measurement gap and fully overlapped with the SMTC while the SMTC and the measurement gap are partially overlapped in the FR2, and wherein:

extended evaluation period=$P*T_{evaluation\_period}$, $P=RSF*1/[(1-T\_RLM\_RS/T\_MGRP)]$, $T\_SMTC<T\_MGRP$, $T\_RLM\_RS=T\_SMTC$, $T_{evaluation\_period}$ denotes the evaluation period,
P denotes the relaxing factor,
RSF denotes the RLM sharing factor,
T_RLM_RS denotes the periodicity of the RLM-RS,
T_MGRP denotes a periodicity of a measurement gap repetition period, and
T_SMTC denotes a periodicity of the SMTC.

10. The method of claim 1, wherein the FR1 comprises a frequency range of 450 MHz~6000 MHz, and wherein the FR2 comprises a frequency range of 24250 MHz~52600 MHz.

11. An apparatus, comprising:
a transceiver which, during operation, wirelessly communicates with a cell of a wireless network via a radio link; and
a processor coupled to the transceiver such that, during operation, the processor performs, via the transceiver, radio link monitoring (RLM) with respect to the radio link by:
  determining whether an RLM reference signal (RLM-RS) is overlapped with either or both of a measurement gap or a synchronization signal (SS)/physical broadcast channel (PBCH) block measurement time configuration (SMTC); and
  extending an evaluation period for the RLM based on a periodicity of the RLM-RS or an RLM sharing factor responsive to a result of the determining indicating that the RLM-RS is at least partially overlapped with either or both of the measurement gap and the SMTC,
wherein the RLM sharing factor is a predetermined value,
wherein the extending of the evaluation period for the RLM comprises extending the evaluation period for the RLM by a relaxing factor P responsive to the RLM-RS being partially overlapped with the SMTC but not overlapped with the measurement gap in a second frequency range (FR2) which is higher than a first frequency range (FR1), and wherein:

extended evaluation period=$P*T_{evaluation\_period}$, $P=1/(1-T\_RLM\_RS/T\_SMTC)$, $T\_RLM\_RS<T\_SMTC$, $T_{evaluation\text{-}period}$ denotes the evaluation period,
P denotes the relaxing factor,
T_RLM_RS denotes the periodicity of the RLM-RS, and
T_SMTC denotes a periodicity of the SMTC.

12. The apparatus of claim 11, wherein, in performing the RLM, the processor performs a synchronization sequence block (SSB)-based RLM or a channel state information reference signal (CSI-RS)-based RLM.

13. The apparatus of claim 11, wherein, in extending the evaluation period for the RLM, the processor further performs either:
 extending the evaluation period for the RLM in the FR1 responsive to the RLM-RS being partially or fully overlapped with the measurement gap; or
 extending the evaluation period for the RLM in the FR2 responsive to the RLM-RS being partially or fully overlapped with the measurement gap or the RLM being partially or fully overlapped with the SMTC with respect to the cell of the wireless network.

14. The apparatus of claim 11, wherein the FR1 comprises a frequency range of 450 MHz~6000 MHz, and wherein the FR2 comprises a frequency range of 24250 MHz~52600 MHz.

* * * * *